United States Patent [19]

Nowobilski et al.

[11] Patent Number: 5,538,544
[45] Date of Patent: Jul. 23, 1996

[54] ADSORPTION FLOW DISTRIBUTION

[75] Inventors: Jeffert J. Nowobilski, Orchard Park; Christian F. Gottzmann, Clarence; Frank Notaro, Amherst, all of N.Y.

[73] Assignee: Praxair Technology, Inc., Danbury, Conn.

[21] Appl. No.: 363,795

[22] Filed: Dec. 27, 1994

[51] Int. Cl.⁶ ................................................. B01D 53/04
[52] U.S. Cl. ............................... 96/152; 96/139; 422/176; 422/311
[58] Field of Search .......................... 96/108, 139, 152; 422/176, 220, 311

[56] References Cited

U.S. PATENT DOCUMENTS

| | | | |
|---|---|---|---|
| 2,435,781 | 2/1948 | Heydorn | 96/139 |
| 2,657,121 | 10/1953 | Rollins | 422/220 X |
| 2,915,375 | 12/1959 | Shirk et al. | 422/220 |
| 2,925,331 | 2/1960 | Kazmierczak et al. | 422/220 |
| 3,431,084 | 3/1969 | Forbes | 422/220 X |
| 3,479,146 | 11/1969 | Hochman et al. | 422/220 |
| 3,498,755 | 3/1970 | Borre | 422/220 X |
| 3,545,939 | 12/1970 | Cox, Jr. et al. | 422/220 X |
| 3,560,167 | 2/1971 | Bruckner et al. | 422/220 |
| 3,598,539 | 8/1971 | Pizzato | 422/220 |
| 4,285,910 | 8/1981 | Kennedy, Jr. | 422/220 X |
| 4,579,647 | 4/1986 | Smith | 422/220 X |
| 4,660,385 | 4/1987 | Macriss et al. | 96/139 X |
| 4,705,621 | 11/1987 | Penick | 422/220 X |
| 4,708,852 | 11/1987 | Helbling, Jr. et al. | 422/220 |
| 4,743,433 | 5/1988 | Smith | 422/220 |
| 5,169,413 | 12/1992 | Leavitt | 55/25 |
| 5,298,226 | 3/1994 | Nowobilski | 422/171 |

FOREIGN PATENT DOCUMENTS

| | | | |
|---|---|---|---|
| 5-076717 | 3/1993 | Japan | 96/108 |
| 1171074 | 8/1985 | U.S.S.R. | 96/108 |

*Primary Examiner*—Robert Spitzer
*Attorney, Agent, or Firm*—Alvin H. Fritschler

[57] ABSTRACT

A non-uniform, graded ball adsorbent bed support is employed in the head section of an adsorption vessel to achieve a uniform flow of gas to the adsorbent bed. The open areas of an inlet gas distributor are also varied to channel gas toward the edge portion of the vessel head to enhance the uniform flow of gas to the adsorbent bed.

20 Claims, 6 Drawing Sheets

ADSORPTION FLOW DISTRIBUTION

BACKGROUND OF THE INVENTION

1. Field of the Invention

The invention relates to pressure swing adsorption gas separation operations. More particularly, it relates to an improved flow distribution system for pressure swing adsorption vessels.

2. Description of the Prior Art

Adsorption processes have been widely used for the separation and purification of gasses. In recent years, pressure swing adsorption (PSA) systems have been developed for enhanced gas separation operations, particularly for the commercial production of oxygen and/or nitrogen from air. In the operation of PSA systems, an adsorption-desorption-repressurization processing sequence is employed, with the passage of air or other feed gas mixture at an upper adsorption pressure to an adsorption system for the selective adsorption of a more readily adsorbable component of air or other feed gas mixture by one or more adsorbent beds, and the passage through said bed(s) of a less readily adsorbable component. The bed(s) is then depressurized to a lower desorption pressure for the desorption of the more readily adsorbable component from the adsorbent bed(s), and the bed(s) is then repressurized to the upper adsorption pressure as cyclic operations are continued.

In order to fully utilize the adsorbent material employed, PSA systems require uniform flow of gas across the adsorbent bed(s) throughout the PSA processing cycle. In addition, large void volumes and pressure drops in the PSA vessel entrance and exit regions, which have adverse effects on the process performance of a PSA system, need to be mitigated in practical commercial operations. In this regard, those skilled in the art will appreciate that, in PSA systems, e.g. vacuum pressure swing adsorption (VPSA) systems, the adsorbent bed support and the flow distribution system are costly, and become more costly as the diameter of an adsorbent bed increases. The typical bed support system is also prone to adsorbent leakage if not assembled correctly. Repair of a leaking bed support system can be costly and time-consuming. Common bed designs and flow distribution systems that employ bed support plates and associated flow distribution systems, incorporating support ribs, tend to give rise to localized non-uniform gas flow, which results in an undesired penalty in gas separation performance.

Four general approaches have been employed in commercial practice in attempting to achieve uniform flow in PSA vessels. In one approach, described in "How to Design Fluid - Flow Distributors" by D. R. Richardson, Chemical Engineering, May 1, 1961, a pressure drop is added in the form of a perforated plate or screens positioned across the adsorbent bed. This approach is the least desirable for PSA systems because PSA vessels are large and the inlet, pipe velocities are relatively high, resulting in the need for a high pressure drop across the bed to achieve good gas flow distribution. Such a pressure drop, however, increases the PSA system power requirements, which renders the PSA system, particularly a VPSA system, less competitive in satisfying the requirements of commercial operations.

A second approach incorporates a turning plate that is placed from 1 to 3 pipe diameters from the gas inlet pipe of the system. This plate turns the main inlet(s) gas flow and causes it to diffuse into the head area of the vessel rather than impinge directly into the adsorbent bed. This results in a low pressure drop across the adsorbent bed, but with relatively poor flow distribution, because of the vortices set up in the head area of the vessel which, in turn, impinge on the bed.

A third approach relates to the positioning of a flow distribution plate parallel to the adsorbent bed across the entire head region of the PSA vessel. Such a flow distribution plate contains perforated sections of different open areas that force the gas flow reaching the adsorbent bed to be generally uniform. This approach is further described in the Nowobilski patent, U.S. Pat. No. 5,298,226, issued Mar. 29, 1994. This third approach, as with the first two approaches, employs, in practice, support ribs to stiffen the perforated plate in the radial and circumferential directions. Such support ribs cause areas of high and uneven gas flows due to their inherent channeling of the gas flow.

The fourth approach attempting to achieve uniform gas flow incorporates both flow distribution and bed support through the use of graded balls or cylinders that are built up in decreasing sizes to support the bed of adsorbent material in the PSA vessel. A small basket or plate that may not be of the full bed diameter forms an inlet plenum for the PSA vessel. If the bed adsorbent material is approximately $\frac{1}{16}$" diameter, for example, the bed support would be multiple 3" deep layers of $\frac{1}{8}$", $\frac{1}{4}$", $\frac{1}{2}$", $\frac{3}{4}$", 1" and 2" diameter ceramic balls, e.g. as shown in Norton, Denstone Inert Catalyst Bed Supports Catalog No. 410027/992. The size of the bed support is such that the smaller particles do not fit between the interstricial spaces of the next size larger particles. The difficulty encountered with this approach is that there is no mechanism to control the flow distribution to the adsorbent bed except by lengthening the bed support section. This, in turn, results in more support material costs, greater void volume in the inlet head and higher pressure drops.

It is an object of the invention to provide an improved adsorbent vessel head section capable of achieving a uniform flow of gas to an adsorbent bed therein.

It is another object of the invention to provide an improved PSA vessel capable of achieving uniform gas flow in an adsorbent bed with reduced void volume and pressure drop.

With these and other objects in mind, the invention is hereinafter described in detail, the novel features thereof being particularly pointed out in the appended claims.

SUMMARY OF THE INVENTION

Uniform flow to an adsorbent bed positioned in a vertical cylindrical vessel is achieved through the use of a perforated inlet gas distributor having a varying open area together with a graded ball bed support in non-uniform layers in the vessel head. By employing a proper open area of the perforated distributor, and a suitable non-uniform graded ball distribution, very uniform gas flow is achieved at the entrance of the adsorbent bed.

BRIEF DESCRIPTION OF THE DRAWINGS

The invention is hereinafter further described with reference to the accompanying drawings in which.

DETAILED DESCRIPTION OF THE INVENTION

Figure 1:
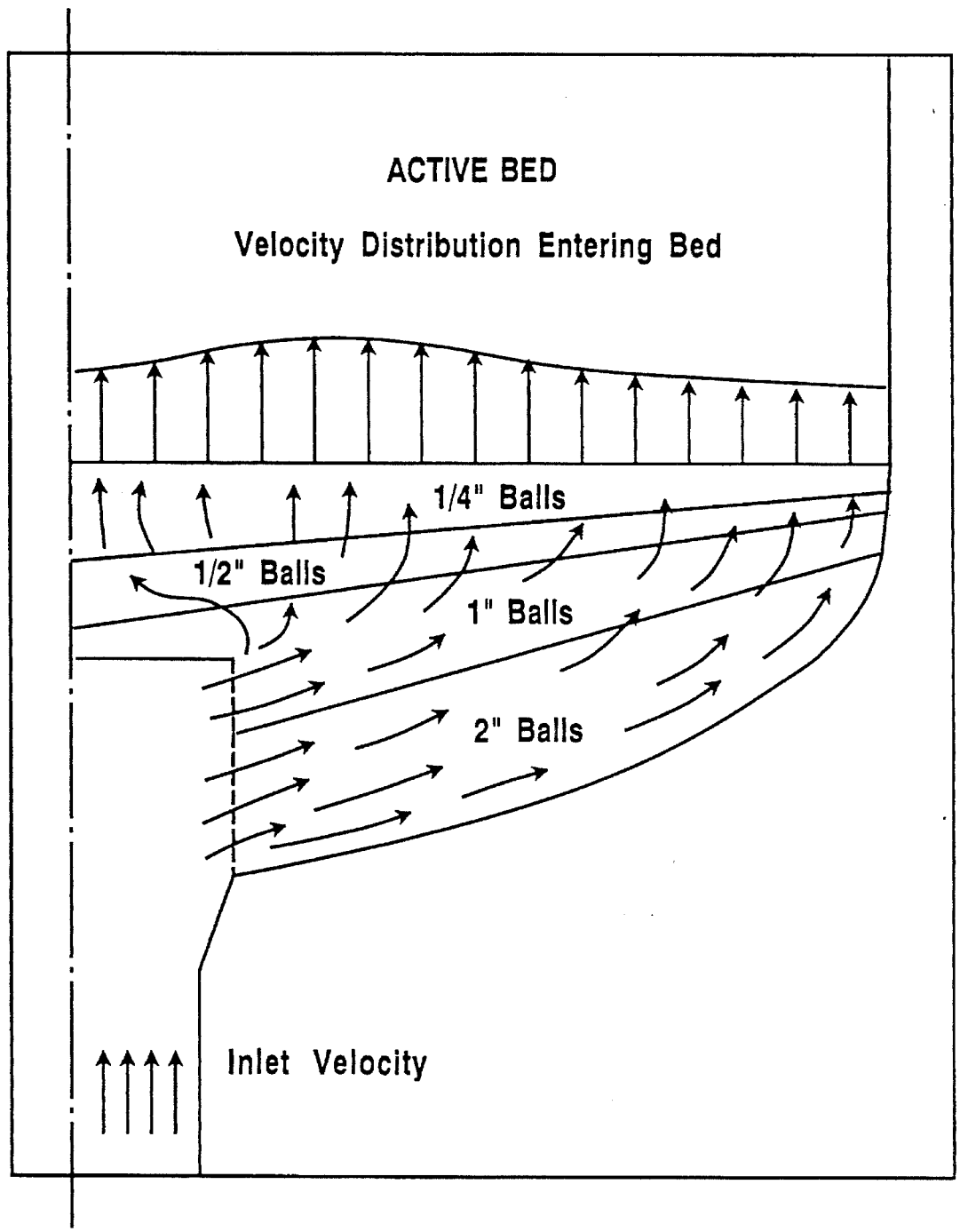
FIG. 1 is a schematic representation of the non-uniform graded ball bed support and inlet gas distributor arrangement of the invention.

The objects of the invention are accomplished, in preferred embodiments, by employing a perforated inlet gas distributor with a varying open area and a graded ball bed support in non-uniform layers over the inlet gas distributor to compensate for non-uniform gas flow generated by the perforated inlet gas distributor and different path lengths to the adsorbent bed. Through a combination of these features, very uniform flow can be achieved at the entrance of the adsorbent bed.

The invention eliminates the need for costly perforated plate bed supports and their support ribs that serve to generate non-uniform gas flow. It also eliminates the need for a flow distribution baffle plate and its support ribs. This reduces the void volume in the bed space, and the overall cost of the adsorption system, while providing more uniform flow than various plate bed support designs.

The essence of the invention thus resides, in preferred embodiments thereof, in the use of the inlet gas distributor having different open areas over its surface to start the flow of gas moving in the desired directions, followed by the use of the non-uniform graded ball bed support to channel the gas flow from the flow gas distributor to the overhead adsorbent bed with essentially uniform flow at the entrance to the adsorbent bed. The non-uniform graded ball bed support is arranged so that non-uniform layers of inactive spheres employed therein extend from the perforated gas distributor, i.e. inlet plenum, in such a manner as to reach at least to 70% of the diameter of the adsorption vessel. In preferred embodiments of the invention, said non-uniform layers of spheres extend to at least 85% of the diameter of the adsorption vessel.

The inlet plenum is designed to extend in height from between 20% to 100% of the depth of the head space of the adsorption vessel. Preferably, it should extend from between 30% to 70% of the depth of said vessel head. The diameter of the gas distributor or inlet plenum is generally in the range of from 10% to 80% of the adsorption vessel diameter. Preferably, the inlet plenum diameter is in the range of from 30% to 60% of said vessel diameter.

As indicated above, very uniform flow distribution can be achieved at the entrance of the adsorbent bed by the selection of a desirable combination of open area of the perforated gas distributor or inlet plenum and non-uniform graded ball bed support. The pressure drop and void volume aspects of the practice of the invention are traded off through the sizing of the inlet plenum. Such variability provides for a more uniform gas velocity distribution entering the adsorbent bed and enables the void volume in the vessel head and the pressure drop across said vessel head to be optimized in practical commercial operations. This avoids the necessity for lengthening the bed support to achieve a more uniform flow as in the use of a conventional graded ball bed support.

In conventional adsorption systems employing a graded ball bed support, an adsorption vessel generally contains a bed of adsorbent material supported on a graded bed of ceramic balls filling the vessel inlet head space. For example, the ceramic balls may be distributed as indicated above, with a layer of 2" balls being placed at the bottom of the vessel head, and with successive uniform layers of 1" balls ½" balls, ¼" balls and ⅛" balls extending to the top of the head space to support the adsorbent particles, typically ¹⁄₁₆" particles in the main portion of the adsorption vessel. A fluid inlet conduit extends to the bottom portion of the vessel head for fluid communication with an inlet plenum that extends upward therein, e.g. as to the height of the bottom, 2" ball layer. The overall economics of the graded ball bed support system depends on a variety of variables such as the cost of the desired product gas produced in the adsorption process, the power requirements, the adsorbent material employed and the adsorption vessel configuration. The relative value and impact of such factors will vary with the gas separation of purification processes being employed and the location at which such processes are being carried out.

In the operation of graded ball bed support systems, a feed gas flow is passed through a small inlet pipe at relatively high velocity and expands into the inlet plenum. The inlet plenum serves three functions, the first being to keep the non-active ceramic balls in the head area out of the inlet pipe, and to serve as a structural support for the bed directly above it. The second function of the inlet plenum is to reduce the velocity of the gas flow entering the bed of adsorbent material, e.g. zeolitic molecular sieves, activated carbon or alumina and the like. This, in turn, reduces the pressure drop in the vessel entrance area, i.e. the vessel head. For example, if gas were passed through a 2.5 ft. diameter inlet pipe at 40 ft./sec. at 90 psia and 50° F., and were to impinge directly on the largest 2" diameter balls, a pressure drop of 2 psi/inch of bed depth would occur in the immediate area of the inlet pipe. An inlet plenum having 10 times the pipe area, i.e. a 4 ft. diameter ×3 ft. high, would result in a pressure drop of only 0.02 psi/inch. Thus would result in a significant power savings. However, a void volume penalty is incurred since 20 ft.$^3$ of additional void volume is added due to the inlet plenum area not being filled with balls that would otherwise take up approximately 60% of the void.

The third function of the inlet plenum is to direct the incoming gas flow in the desired direction. Two effects are handled by varying the open area of the inlet plenum in the practice of the invention. The first effect is the dynamic head of the flowing fluid. This results in a higher pressure in the area of the gas distributor or inlet plenum directly above the inlet pipe. This higher pressure will result in a larger flow through the center area of the bed than at the outer areas of the bed. This undesirable effect is reduced by reducing the open area in the center area of the inlet plenum compared to the edge area. In the example, the dynamic head is about 0.1 psi, and its effect is handled by reducing the open area in the central area of the inlet plenum to only 1%. The second effect to be accounted for is due to the geometry of the inlet plenum and the adsorbent bed. The inlet plenum top may have an area of from about 5% to 10% of the adsorbent bed. For example, with a bed diameter of 16 ft. and an inlet plenum top area of 12.7 ft$^2$, an area ratio of only 6% is achieved. The majority of the gas flow, therefore, has to exit through the sides of the inlet plenum and reach the edges of the adsorption vessel. In a cylindrical inlet plenum, the gas flow will exit the side of the plenum cylinder. The side open area is kept as large as possible, consistent with the structural loads on the inlet plenum. The side open area will typically be about 50% of the overall side area.

After the gas flow leaves the inlet plenum, it enters the graded ball bed support in the head space of the adsorption vessel. The primary function of the graded balls is to support the adsorbent bed at a reasonable pressure drop. As indicated above, this is carried out in the art by placing layers of different size inactive balls in the vessel head, with each size ball generally being twice the diameter of the balls in the layer above it. Thus, if the molecular sieve, carbon, alumina or other adsorbent material is about 1/16" diameter, the non-active ceramic ball layer directly beneath it is desirably about 1/8" diameter, with a typical layer thickness of about 3". Beneath the 1/8" layer, a 3" layer of 1/4" balls, followed by a 4" layer of 1/2" balls is positioned, with a bottom 5" layer of 3/4" balls. In conventional practice, a plate bed support is typically used in the head area, that is, under such uniform, gradual ball bed support. The increase in ball diameter employed in such uniform, graded ball bed supports is such that the smaller diameter spheres do not fall through the interstitial spaces in the larger particles in the next lower layer. In theory for perfectly stacked spheres, the diameter of the interstitial space is about 1/5 the diameter of the larger sphere. In practice, a diameter ratio of 1/2 is used to account for the non-uniform packing of non-uniform ceramic balls. Larger diameter ratios would add extra layers and increase both costs and the pressure drop across the vessel head. The thickness of the layer of balls should generally be minimum of 3 sphere diameters. Another approach is to use, for example, an 8" layer of 1" balls, and then to fill the remainder of the vessel head with 2" balls. The inlet plenum is typically a small Johnson screen, approximately 12" in diameter and 17" high. The void volume can be minimized by use of a small inlet plenum, but because of a small inlet plenum and the uniform graded ball bed support of conventional practice, a poor velocity distribution is found to occur across the bottom of the adsorbent bed.

Figure 2:
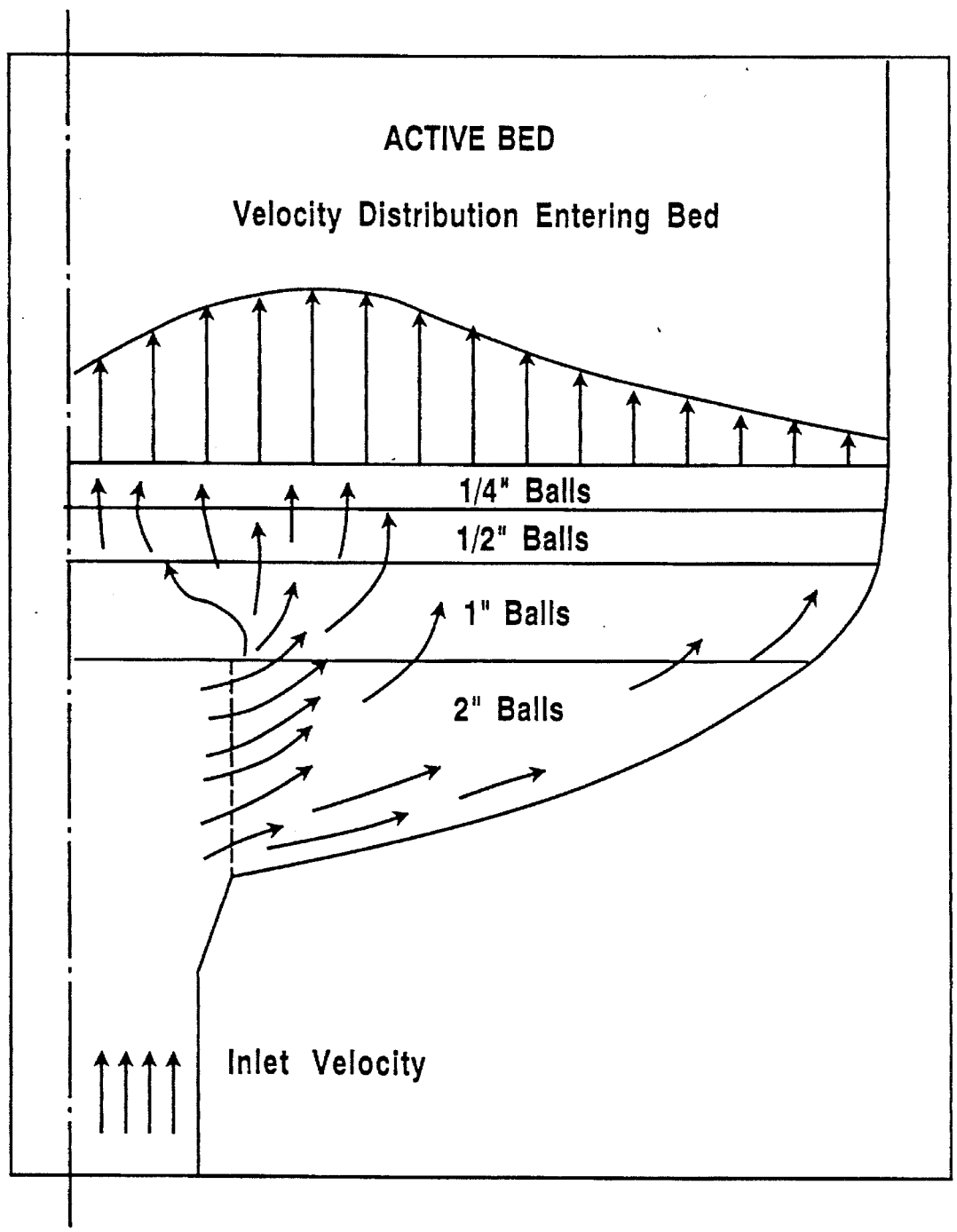
FIG. 2 is a schematic representation of a corresponding embodiment of a graded, uniform bed support of conventional practice.

In the practice of the invention, the graded ball bed support achieves improved gas flow distribution through the use of a non-uniform arrangement of the ball support. The non-uniform bed support utilizes the variation in pressure drop through the different size balls to desirably force or channel the flow of gas to the outer region of the adsorbent vessel. A desirable embodiment of the invention is illustrated in FIG. 1 of the drawings. As shown therein, the larger balls, e.g. 2" balls, are used to provide a low resistance path to the edges of the adsorbent vessel. This is in contrast to a conventional graded ball bed support arrangement, as illustrated in FIG. 2 of the drawings, in which each layer of balls is deposited on the next lower layer in uniform fashion, i.e. in even or leveled layers, not providing such a low resistance path upward to the edge of the vessel head. As shown in said FIG. 1, the largest balls, i.e. 2" balls, are placed so as to extend from the lower portion of the inlet plenum upward and outward to the edge of the vessel head at a vertical height above the upper edge of the inlet plenum. This provides a low resistance gas flow path upward and outward to the vessel wall and enables a relatively uniform gas velocity distribution to be achieved across the bottom of the adsorbent bed. In the conventional support arrangement, the 2" ball layer will be seen to have an upper surface that extends horizontally from the inlet plenum to the edge of the vessel head. This arrangement does not force the flow of gas from the inlet plenum outward, as in the FIG. 1 embodiment of the invention, and a less desirable, less uniform, more centrally concentrated gas velocity distribution to the adsorbent bed is achieved.

It will be seen that the non-uniform graded ball distribution of the FIG. 1 embodiment provides for the upper ball layers to extend upward and outward from the center of the vessel head with each such layer generally tapering in the outward direction so that the thickness of said layers, i.e. the 1" ball layer, the 1/2" ball layer and the 1/4" ball layer, is thinner at the outer edge of the head section that at the center thereof, thereby facilitating the flow of gas upward near the edge of the vessel head. By contrast, the uniform graded ball distribution of the conventional arrangement, as shown in FIG. 2, provides for such upper layers to extend in a uniform fashion horizontally across the vessel head. In this conventional arrangement, each of said upper ball layers above the inlet plenum has a uniform thickness from the center of the vessel head to the outer edge thereof. It should be noted, as an example that, at the same gas flow rate, the pressure drop/foot of 2" balls is 1/4 of the pressure drop of 1/2" balls. By the non-uniform arrangement of the graded ball bed support in the practice of the invention, a more uniform gas flow distribution can be achieved, and the void volume in the head space is desirably reduced, as compared with conventional uniform graded ball bed support arrangements.

The optimum vessel head arrangement for any given adsorption vessel and gas flow combination is determined by the interaction of the flow dynamic head, turning losses, recirculation vortices, the flow through the perforated inlet plenum, and the gas flow through the graded ball fill to achieve the desired minimum pressure drop and a flat or uniform velocity profile at the entrance of the adsorbent bed. In a representative example of the use of the invention in a gas prepurifier adsorption vessel, the vessel has a 16 ft. diameter, with an inlet air flow of $4.7 \times 10^6$ NCFH at 90 psia from a 30" diameter inlet pipe. In a conventional uniform graded ball bed support design, the inlet plenum has a 36" diameter and a height of 39". The top of the inlet plenum cylinder is solid and the sides have a 50% open area. A vessel head full of inactive alumina consists of a level layer 1/2" diameter balls filled to 1" above the top of the inlet plenum, with a 13" level layer of 1/4" diameter alumina balls deposited thereon. The main portion of the vessel is filled with a 5 ft. bed of $5 \times 8$ activated alumina adsorbent. The flow distribution obtained upon use of such conventional design vessel has a +13% to −12% velocity variation from the velocity at the center of the vessel, with the higher velocity being observed about 1/4 of the distance from the center line of the vessel to the vessel edge, and the lower velocity occurring at the edge of the vessel. This conforms generally with the velocity distribution entering the adsorbent bed as shown for the head section configuration shown in FIG. 2 of the drawings. The cause of the low velocity at the edge of the vessel is the high resistance gas flow encounters in trying to flow through the layer of 1/2" balls to reach the edge of the vessel head. The result is that a larger than average flow follows the shorter path from the top edge of the flow distributor more directly to the bottom of the adsorbent bed, resulting in the indicated higher gas flow velocity in that region.

Figure 3:
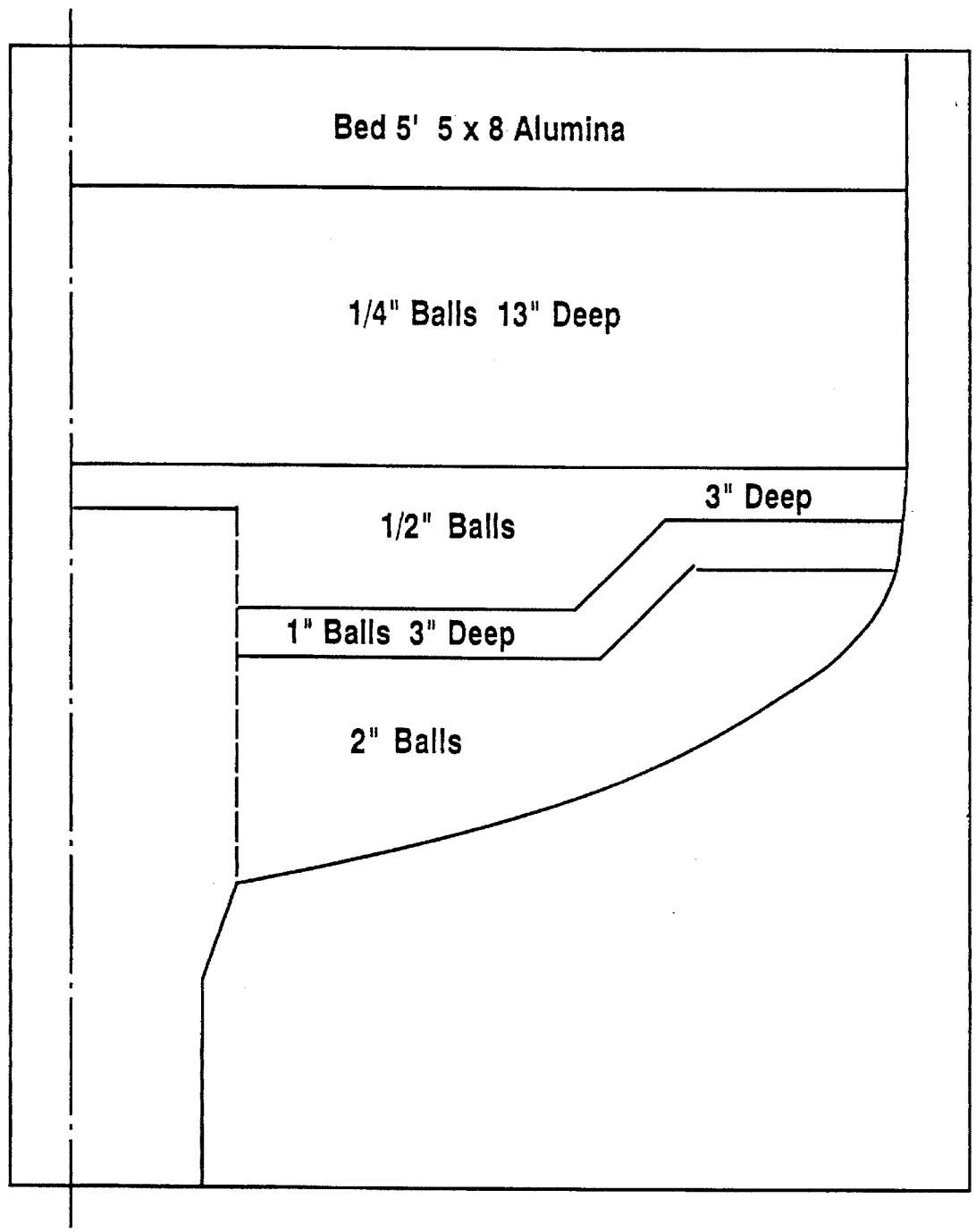
FIG. 3 is a schematic representation of another embodiment of the invention providing a desirable non-uniform graded ball bed support of the adsorbent bed.

The invention serves to reduce the resistance to the flow of gas to the edge of the vessel head by placing a 2" diameter ball fill in the head portion of the adsorption vessel, and carrying it up the edge of the head until it is within about 3" of the top of the inlet plenum in the embodiment illustrated in FIG. 3 of the drawings. The 2" fill is than covered with 3"–5" of 1" diameter fill generally following the same contour. The bed support is then leveled with 1/2" diameter fill that varies in the example from a minimum thickness of 3" at the edge to a maximum 10" in the center of the vessel head. The final layer of ¼" diameter balls is a uniform 13" thick. A greatly improved velocity distribution is obtained thereby. The maximum velocity still occurs above the edge of the inlet distributor, but the peak velocity is reduced from +13% to +8%. More importantly, the edge velocity is only −3% below the mean velocity rather than −12%.

In the representative example above, the velocity at the center of the head section is not below the mean bed velocity, but this will not always be the case. For larger diameter inlet plenums, i.e. larger inlet distributors, the flow of gas through the low section of balls in the center of the bed can be improved by providing, for example, a 1% open area perforated plate using ¼" diameter holes in place of a solid top of the inlet plenum. This perforated plate enabling gas flow upward from the inlet plenum, combined with the flow from the top edge of the inlet plenum, serves to provide a more uniform velocity of flow in the center portion and across the adsorption vessel using an 8' diameter inlet plenum. Thus, using a solid top plate of the inlet plenum, in the embodiment shown in FIG. 4 of the drawings, the velocity distribution is from −11% near the center to +3.5% at the vessel edge. With said 1% open area in the top plate, the velocity distribution was improved so that about a +2% velocity existed at the center of the vessel with a generally uniform, slightly decreasing velocity occurring across the vessel head to a velocity of only −1.2% at the edge. Clearly, the use of a perforated top plate of the plenum provides an improved velocity distribution as compared with the use of a solid, non-perforated top plate.

Figure 5:
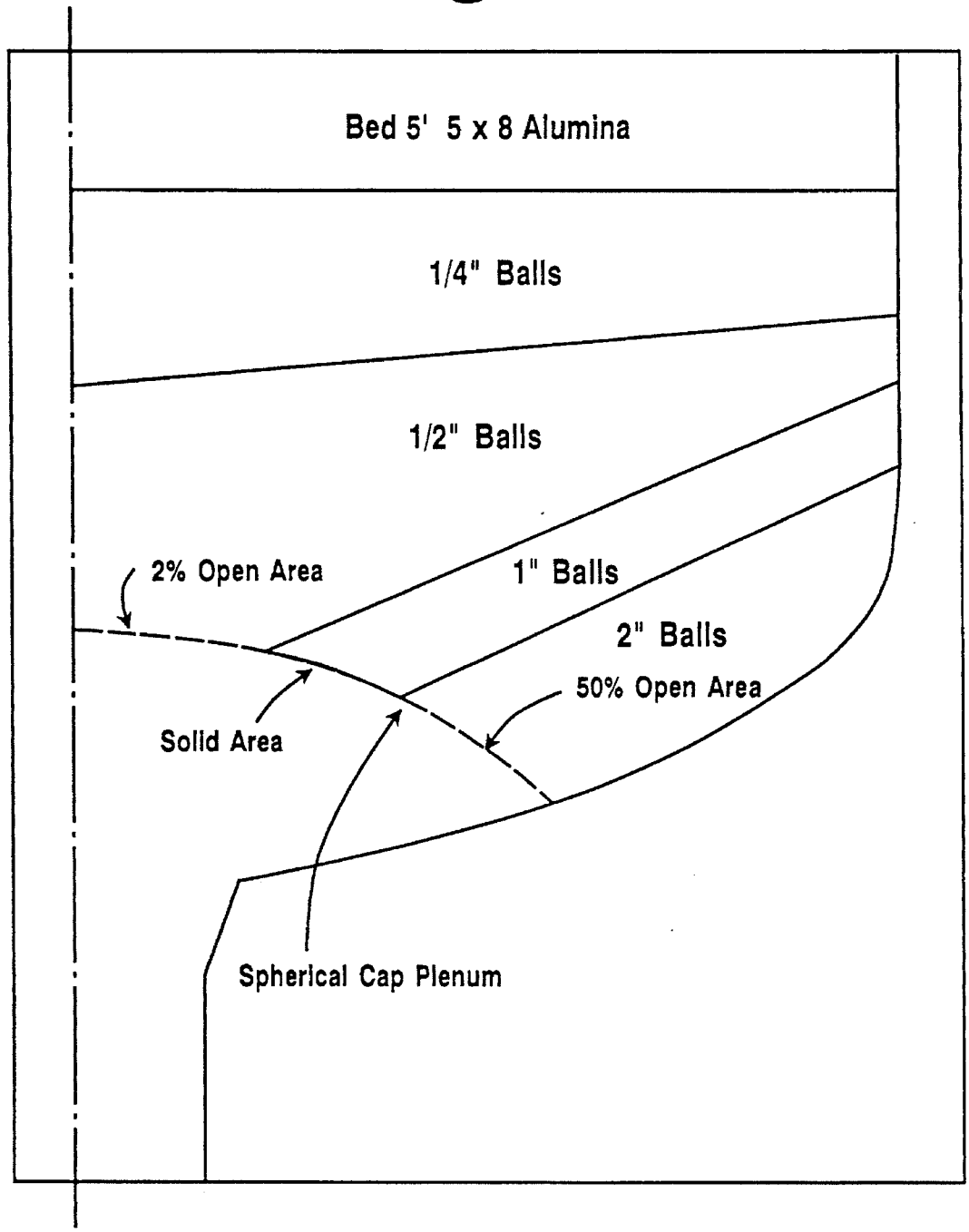
FIG. 5 is a schematic representation of an embodiment of the invention comprising a spherical cap plenum having two different perforated areas.

In the representative examples of the invention above, a cylindrical inlet plenum was employed. This design is convenient to build, but, as the diameter increases, the flat top plate becomes very thick, or reinforcement must be added in the form of center support posts or cross channels welded to the top or bottom of the flat distributor top plate. In an alternative embodiment of the invention, the inlet plenum can be a spherical cap that has two or more different perforated areas as illustrated in FIG. 5 of the drawings. The spherical cap can be welded to the inside of the vessel head directly over the inlet pipe. The perforations in said cap are preferably varied to facilitate the desired gas flow distribution in the vessel head. In a particular embodiment, for example, the center area of the spherical cap of the inlet plenum, i.e. the area near the center of the vessel head, may be from 5% to 20% of the overall inlet distributor area, with the perforated open area thereof being between about 0.1% and about 10%, with the perforation diameter being between ⅛" and 1". The middle area of the spherical cap may be from 5% to 50% of the overall inlet distributor area, with the perforated open area thereof varying from 0% to 10%, with the perforation diameter being between ⅛" and 1". The outer open area, in the area of the spherical cap extending farthest outward toward the edge of the vessel head, is made as large as structurally possible since this outer area will be instrumental in directing gas flow to the outer edge of said vessel head. Typically, this perforated open area will be from 40% to 60%, with a hole diameter between ½" and 1". In the embodiment illustrated in said FIG. 5, the outer portion of the spherical cap, i.e. the area contacting the portion of the graded ball bed support comprising 2" balls, has a perforated open area of about 50%, and the center portion of the spherical cap, i.e. the portion near the center of the vessel head in contact with ½" balls, has a perforated open area of about 2%, with the middle portion of the spherical cap, in contact with 1" balls, being a solid area.

Figure 6:
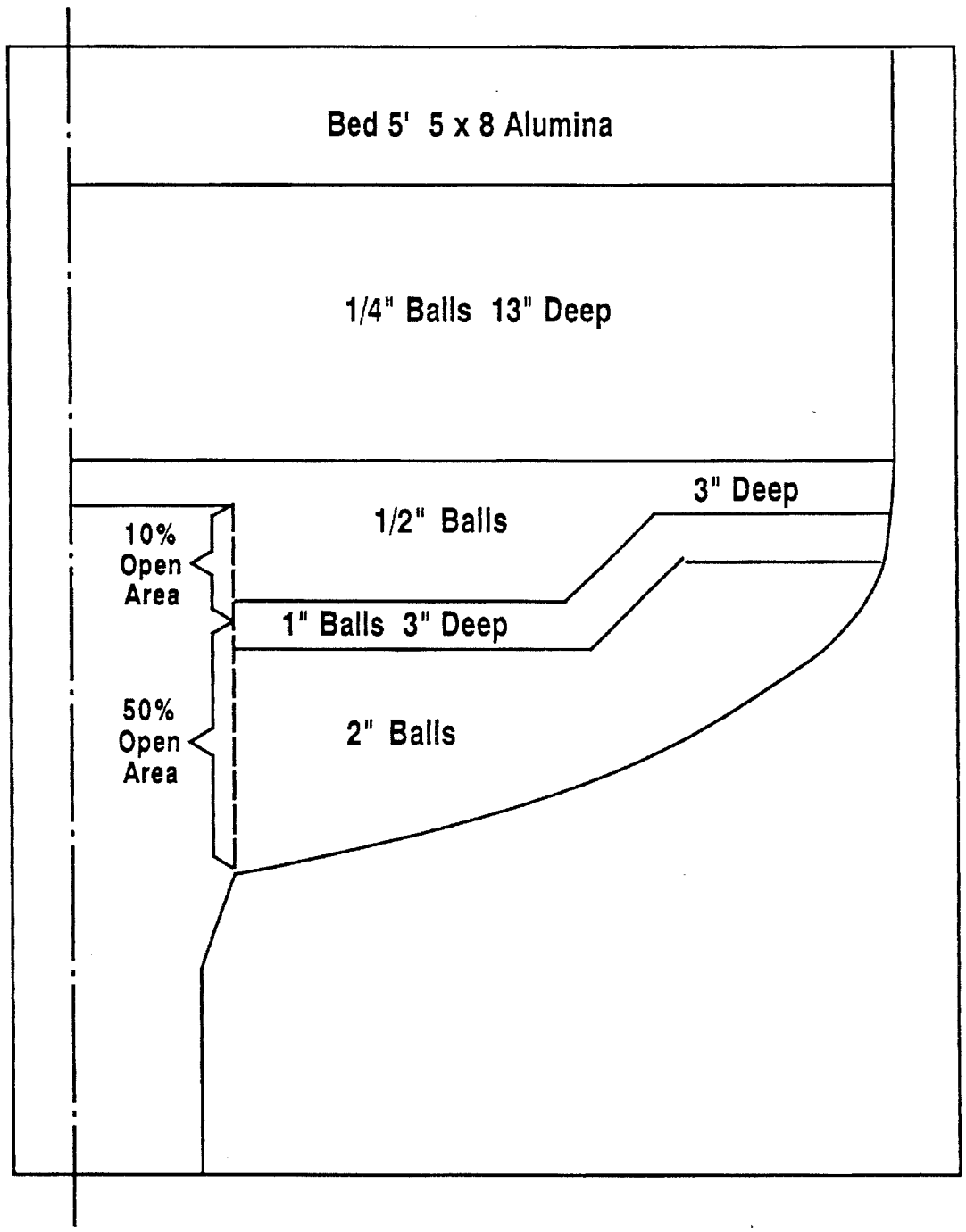
FIG. 6 is a schematic representation of an embodiment of the invention comprising a cylindrical plenum with variable open area side walls.

In another embodiment of the invention as shown in FIG. 6 of the drawings, a cylindrical inlet plenum is provided with a variable open area in the lower and upper cylindrical sections of said plenum. For this purpose, the lower section, i.e. the part in contact with the 2" balls of the graded support, as well as part of the 1" ball layer, has an open area of between 40% to 60%, e.g. 50%, with perforation diameters typically between ½" and 1". The upper section, i.e. the part in contact with part of the 1" ball layer and the ½" ball layer, has an open area of between 20% and 2%, e.g. 10%, with the same diameter of perforations. The lesser open area in the upper section of the inlet plenum serves to control the upward gas flow from the top edge of said plenum. Thus, the gas velocity at the inlet plenum will be reduced, and more gas will be forced to flow toward the outer edge of the vessel head. As noted above, the flat top of the inlet plenum can include an open area or areas, which can be varied to achieve a more uniform upward velocity distribution in the center portion of the vessel head.

It will be appreciated that various changes can be made in the details of the invention, as described herein, without departing from the scope of the invention as recited in the appended claims. Thus, while reference has been made particularly to VSPA and other PSA systems, the invention can also be employed to other adsorption systems, such as a thermal swing adsorption system. Those skilled in the art will appreciate that the invention can also be used to provide an improved gas flow distribution in a variety of other processing vessels, including these in which the vessels contain catalytic materials rather than adsorbent materials, but where uniform gas flow is also desired in practical commercial operations. While the invention has also been described particularly with respect to the particular size of the non-uniform graded ball bed support configuration for an adsorbent bed of 1/16" or ⅛" particles, it will be appreciated that the size of the inactive balls employed in the graded ball support, and the thickness of each layer, in the center of the vessel head and at the edge thereof, will vary depending on the requirements of a given gas separation application. In certain applications, particularly with respect to small vessels, it may be possible to employ an inlet gas distributor having a varying open area together with flat, i.e., uniform, layers of graded balls for the support of the bed.

It will be understood from the illustrated embodiments that each layer of the graded ball bed support need not be deposited in a non-uniform manner. While each layer is non-uniformly arranged across the vessel in the embodiments of FIG. 1 and 5, the smallest ¼" ball layers of the embodiments of FIGS. 3, 5 and 6 are leveled in a uniform manner. In each case, however, the largest 2" ball layer is positioned in a non-uniform manner extending upward toward the edge of the vessel head so as to create a low resistance flow path to the outer edge of the vessel head, with upper ball layers, e.g. 1" balls and ½" balls, arranged in non-uniform manner such as to produce a low resistance flow path from the 2" layer to the adsorbent bed at the outer portion of the adsorption vessel.

Figure 4:
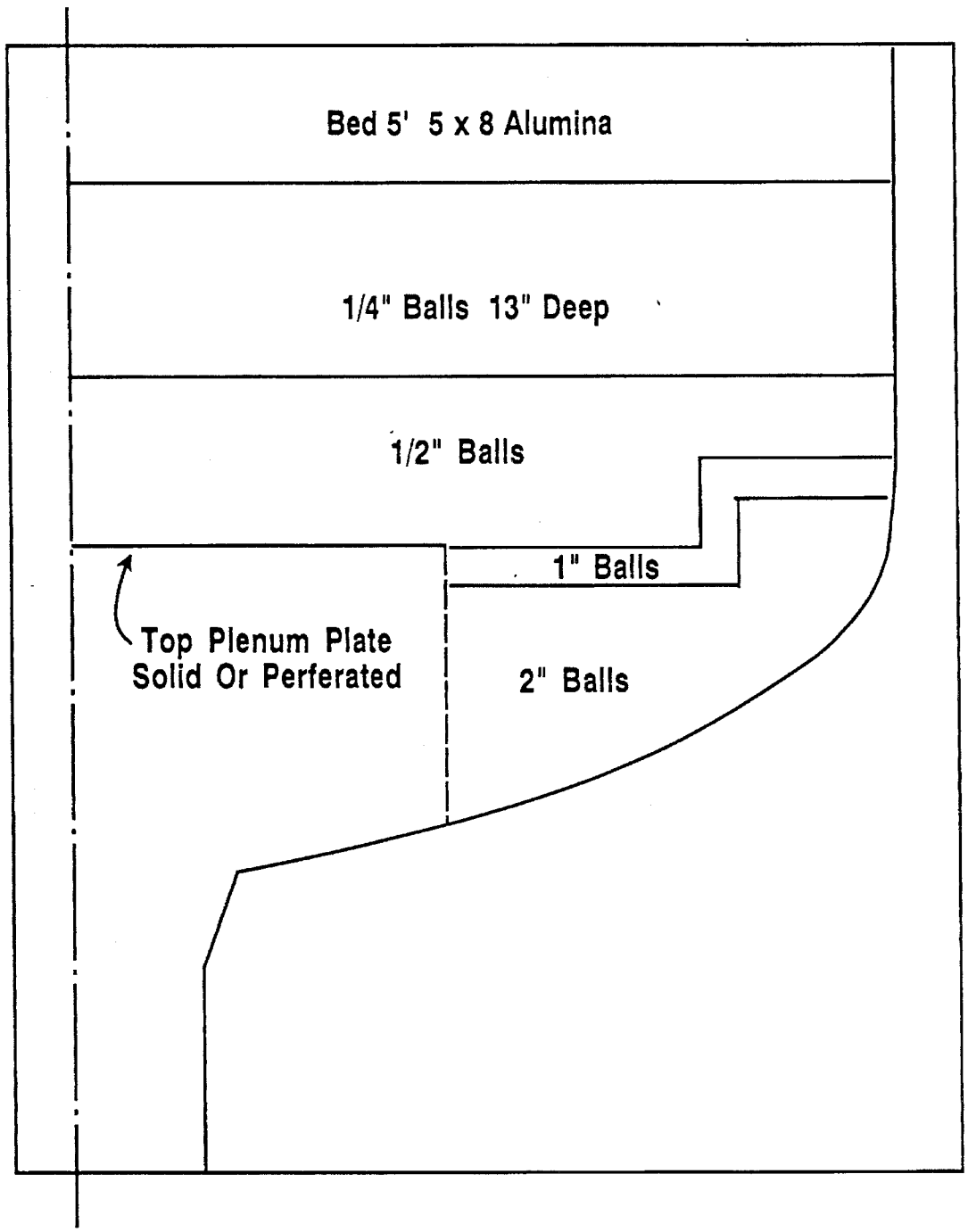
FIG. 4 is a schematic representation of the non-uniform graded ball bed support of the invention having a large inlet plenum with a solid or perforated top plate.

While the embodiment illustrated in FIG. 4 was described above with reference to providing a 1% open area perforated plate in the top portion of the inlet plenum to provide an upward flow of gas and a more uniform gas flow in the center of the vessel, those skilled in the art will appreciate that the open area in the top plate of the inlet plenum, when a perforated upper plate is employed, can be varied, depending on the overall configuration and operating conditions employed, in order to achieve the more uniform velocity distribution desired in the center of the vessel.

In preferred embodiments of the invention, the uniform flow of gas to an adsorbent bed is enhanced through the use of a perforated inlet plenum with a varying open area, together with the non-uniform graded ball bed support described above. As will be appreciated from the illustrated embodiments, it is also within the scope of the invention to provide the non-uniform graded ball support with an inlet plenum of uniform open area, although the combination of such features in the preferred embodiments is especially suitable for directing the flow of gas across the vessel head to achieve a uniform flow velocity to the adsorbent bed.

The invention provides a significant advance in the field of PSA and other adsorption processing for commercially significant air and other gas separation operations. By conveniently enabling more uniform gas flow across an adsorbent bed to be achieved, the invention enables the full adsorptive capacity of the adsorbent bed to be effectively utilized. Large void volume and/or pressure drop requirements in the vessel head are thereby mitigated, and enhanced overall performance of the highly desirable adsorption processes is advantageously in practical commercial operations.

We claim:

1. In an adsorption system for the separation of a more readily adsorbable component of a feed gas mixture containing said component and a less readily adsorbable component, having at least one adsorption vessel containing a bed of adsorbent material capable of selectively adsorbing the more readily adsorbable component of said feed gas mixture, with said adsorbent bed being supported by a graded ball bed support positioned in a head portion of said adsorption vessel, with conduit means for the passage of the feed gas mixture to an inlet plenum positioned in said head portion of said adsorption vessel for the introduction of the feed gas mixture into said graded ball bed support, the improvement comprising a non-uniform graded ball bed support in which the largest size inert balls positioned at the lower portion of said bed support, and in fluid communication with the inlet plenum, are arranged in a ball support layer such that the upper surface thereof extends upward and outward from the center of said head portion of said adsorption vessel to the outer edge thereof so as to create a gas flow path of low resistance to the outer edge of said head portion of said adsorption vessel, whereby the flow of the feed gas mixture from the inlet plenum is channeled across said head portion of said adsorption vessel to provide a uniform flow of said feed gas mixture to the adsorbent bed.

2. The adsorption system of claim 1 in which the non-uniform graded ball bed support comprises multiple layers with each layer being of smaller size balls than the next succeeding lower layer.

3. The adsorption system of claim 2 in which intermediate layers above the bottom layer are arranged so that the upper surface thereof extends upward and outward from the center of the vessel head to the outer edge thereof, with said intermediate layers being tapered so that the thickness of each such layer at the edge of the vessel head is less than the thickness thereof at the center of the vessel head, thereby further facilitating the uniform flow of gas across the adsorption vessel.

4. The adsorption system of claim 3 in which the upper layer of smallest size balls is tapered so that the thickness of said upper layer at the edge of the vessel head is less than the thickness thereof at the center of the vessel head.

5. The adsorption system of claim 4 in which said graded ball bed support comprises layers of 2", 1", ½" and ¼" balls.

6. The adsorption vessel of claim 2 in which intermediate size layers between the largest size balls at the bottom of the bed support and the smallest size balls at the top thereof at the edge of the vessel head is less than the thickness thereof at the center portion of the head.

7. The adsorption system of claim 2 in which said graded ball bed support comprises layers of 2", 1", ½" and ¼" balls.

8. The adsorption system of claim 1 in which the inlet plenum has non-uniform distribution openings to the graded ball bed support, with the bottom portion of the inlet plenum, in fluid communication with at least a portion of the largest ball size, bottom ball layer having a larger open area than the upper portion thereof, thereby further facilitating the channeling of the flow of the feed gas mixture through the largest size balls at the lower portion of the bed support to the edge portion of the vessel head.

9. The adsorption system of claim 8 in which the inlet plenum has a perforated top plate facilitating the flow of gas to the center portion of the vessel head.

10. The adsorption system of claim 8 in which the inlet plenum comprises a spherical cap plenum.

11. The adsorption system of claim 10 in which the outer portion of the spherical cap plenum extending toward the edge of the vessel head has a larger open area than the center portion of said spherical cap plenum in the center of the vessel head.

12. The adsorption system of claim 11 in which the outer portion of the spherical cap plenum is in fluid communication with the largest size balls comprising the bottom portion of the graded ball bed support.

13. The adsorption system of claim 8 in which the inlet plenum comprises a cylindrical plenum having openings in the cylindrical side portions thereof.

14. The adsorption system of claim 13 in which the lower portion of said cylindrical plenum has a larger open area than the upper portion thereof, the lower portion of the cylindrical plenum being in fluid communication with at least the largest size balls in the bottom portion of said graded ball bed support.

15. In a processing system having at least one processing vessel containing a bed of solid material to be contacted by a feed gas mixture, with the bed of solid material being supported by a graded ball bed support positioned in a head portion of said processing vessel, with conduit means for the passage of the feed gas mixture to an inlet plenum positioned in said head portion of said processing vessel for the introduction of the feed gas mixture into said graded ball bed support, the improvement comprising a non-uniform graded ball bed support in which the largest size inert balls positioned at the lower portion of said bed support, and in fluid communication with the inlet plenum, are arranged in a ball support layer such that the upper surface thereof extends upward and outward from the center of said head portion of said processing vessel to the outer edge thereof so as to create a gas flow path of low resistance to the outer edge of said head portion of said processing vessel, whereby the flow of the feed gas mixture from the inlet plenum is channeled across the head portion of said processing vessel to provide a uniform flow of said feed gas mixture to the bed of solid material.

16. The processing system of claim 15 in which the non-uniform graded ball bed support comprises multiple layers with each layer being of small size balls than the next succeeding lower layer.

17. The processing system of claim 16 in which intermediate layers above the bottom layer are arranged so that the upper surface thereof extends upward and outward from the center of the vessel head to the outer edge thereof, with said intermediate layers being tapered so that the thickness of each such layer at the edge of the vessel head is less than the thickness thereof at the center of the vessel head, thereby further facilitating the uniform flow of gas across the processing vessel.

18. The processing system of claim 15 in which the inlet plenum has non-uniform distribution openings to the graded ball bed support, with the bottom portion of the inlet plenum, in fluid communication with at least a portion of the largest ball size, bottom ball layer having a larger open area than the upper portion thereof, thereby further facilitating the channeling of the flow of the feed gas mixture through the largest size balls at the lower portion of the bed support to the edge portion of the vessel head.

19. The adsorption system of claim 18 in which the inlet plenum comprises a spherical cap plenum, the outer portion thereof extending toward the edge of the vessel head having a larger open area than the center portion of said spherical cap plenum in the center of the vessel head.

20. The processing vessel of claim 15 in which the solid material comprises catalyst material.

* * * * *